(12) United States Patent
Pane et al.

(10) Patent No.: US 9,413,790 B2
(45) Date of Patent: Aug. 9, 2016

(54) COMPUTER TELEPHONY HEADSET WITH PRESENCE INDICATOR

(71) Applicant: VXI Corporation, Dover, NH (US)

(72) Inventors: Philip John Pane, Auburn, NH (US); Thomas F. Terrien, Jr., Portsmouth, NH (US); David Alden Jaques, Durham, NH (US); William J. Blank, Jr., Hampton, NH (US); Brian J. Cole, Cotuit, MA (US)

(73) Assignee: VXi Corporation, Dover, NH (US)

( * ) Notice: Subject to any disclaimer, the term of this patent is extended or adjusted under 35 U.S.C. 154(b) by 212 days.

(21) Appl. No.: 14/014,953

(22) Filed: Aug. 30, 2013

(65) Prior Publication Data

US 2014/0153405 A1     Jun. 5, 2014

Related U.S. Application Data

(60) Provisional application No. 61/732,471, filed on Dec. 3, 2012.

(51) Int. Cl.
*H04L 29/06* (2006.01)
*H04M 1/60* (2006.01)
*H04M 1/05* (2006.01)

(52) U.S. Cl.
CPC ......... *H04L 65/1059* (2013.01); *H04M 1/6058* (2013.01); *H04M 1/05* (2013.01)

(58) Field of Classification Search
CPC ... H04L 65/1059; H04M 1/6058; H04M 1/05
See application file for complete search history.

(56) References Cited

U.S. PATENT DOCUMENTS

| | | | |
|---|---|---|---|
| 5,608,794 A | 3/1997 | Larson | |
| 5,608,797 A | 3/1997 | Larsen et al. | |
| 5,793,865 A | 8/1998 | Leifer | |
| 5,943,627 A | 8/1999 | Kim et al. | |
| 6,091,832 A | 7/2000 | Shurman et al. | |
| 6,766,032 B1 | 7/2004 | Lee et al. | |
| 6,879,688 B2 | 4/2005 | Winegar | |
| 6,918,678 B2 | 7/2005 | McClanahan | |
| 7,031,475 B2 | 4/2006 | Kuraoka et al. | |
| 7,114,823 B2 | 10/2006 | McCullough et al. | |
| 7,146,004 B2 | 12/2006 | Bodley et al. | |
| 7,318,654 B2 | 1/2008 | McClanahan | |
| 7,477,922 B2 | 1/2009 | Lewis | |
| 7,536,150 B2 | 5/2009 | Ryann | |
| 7,620,419 B1 | 11/2009 | Gandolfo | |
| 7,620,433 B2 | 11/2009 | Bodley | |
| 7,664,540 B2 | 2/2010 | Tsai | |
| 7,805,171 B2 | 9/2010 | Alameh et al. | |
| 7,920,902 B2 | 4/2011 | Carroll | |
| 7,937,117 B2 | 5/2011 | Dyer | |
| 7,953,454 B2 * | 5/2011 | Ihara | 455/569.1 |
| 8,064,972 B2 | 11/2011 | McLoone et al. | |
| 8,099,141 B2 | 1/2012 | Janik | |
| 8,209,441 B1 * | 6/2012 | Brockway et al. | 710/15 |

(Continued)

OTHER PUBLICATIONS

CounterPath EyeBeam 1.5 for Windows User Guide, Published Nov. 2007 , pp. 25-26.*

*Primary Examiner* — Anh Ngoc Nguyen

(74) *Attorney, Agent, or Firm* — McLane Middleton, Professional Association

(57) ABSTRACT

A telephone headset is provided which includes a presence status indicator thereon for signaling to other persons the user's availability and/or willingness to communicate face-to-face.

20 Claims, 7 Drawing Sheets

(56) References Cited

U.S. PATENT DOCUMENTS

| | | |
|---|---|---|
| 2003/0081766 A1 | 5/2003 | Quarre |
| 2005/0175170 A1* | 8/2005 | Winegar ................ 379/430 |
| 2005/0175171 A1 | 8/2005 | Winegar |
| 2006/0035688 A1 | 2/2006 | Paho et al. |
| 2006/0166717 A1 | 7/2006 | Seshadri et al. |
| 2007/0004463 A1* | 1/2007 | Clark et al. ............. 455/569.1 |
| 2007/0135185 A1 | 6/2007 | Dvorak et al. |
| 2009/0191920 A1 | 7/2009 | Regen et al. |
| 2009/0318202 A1 | 12/2009 | Bodley |
| 2011/0014957 A1* | 1/2011 | Sugimori et al. ......... 455/569.1 |
| 2011/0092157 A1* | 4/2011 | Clark ................ H04M 1/6066 455/41.2 |
| 2012/0220342 A1 | 8/2012 | Holliday |
| 2012/0231769 A1* | 9/2012 | Sakissian ........... H04M 1/6066 455/414.1 |
| 2013/0097244 A1* | 4/2013 | Manley et al. ................ 709/204 |
| 2013/0102361 A1* | 4/2013 | Colley ............... H04M 1/6058 455/557 |

* cited by examiner

COMPUTER TELEPHONY HEADSET WITH PRESENCE INDICATOR

CROSS-REFERENCE TO RELATED APPLICATION

This application claims the benefit of U.S. Provisional Patent Application No. 61/732,471 filed Dec. 3, 2013. The aforementioned application is incorporated herein by reference in its entirety.

BACKGROUND

The present disclosure relates generally to telephone headsets and, more particularly to a telephone headset with a "presence" indicator means thereon for outputting a user's presence status, thereby signaling to other persons the user's availability and/or willingness to communicate face-to-face.

A telephone headset includes an earpiece, including one or more speakers, and a microphone. The earpiece is typically held in place over or near the ear of the user, for example, with an over-the-head band or an ear hook. The microphone is commonly located close to the user's mouth by placement at the end of a boom extending from the earpiece.

Telephone headsets free the user's hands and offer greater comfort and efficiency over conventional telephone handsets. As such, headsets find widespread use in call centers and many other business and professional office settings where telephones are used frequently or for extended periods.

One drawback of headset use in a work environment is that other persons cannot determine whether a user who has donned a headset is available to talk, or on an active telephone call and therefore unavailable to talk. Prior art headsets have addressed this drawback by providing an indicator light, for example, at the end of the microphone boom or elsewhere on the headset, which provides a visual indication to other persons when the telephone headset is in use. Such prior art systems typically monitor the telephone line to determine whether the telephone line is in use (off-hook) or idle (on-hook).

For example, U.S. Pat. No. 5,210,791 discloses a telephone headset on-line indicator that determines the on-line or off-hook condition by monitoring the voltage potential across the transmitting lines between the headset and the base unit. An LED on the microphone boom is illuminated when the headset is in use. U.S. Pat. No. 5,359,647 discloses a headset having an LED in-use indicator on the microphone boom which is activated to indicate that the headset is in use by amplification of the audio signal across the transmission lines. U.S. Pat. No. 8,209,441 discloses a telephone headset for a softphone application having an LED on-line indicator wherein the on-line status is detected by monitoring the host to detect a request for transmit data from the host based on a signaling protocol associated with the host port and independent of the softphone application software.

Network communication systems have recently included the ability to send and receive so-called "presence information" which conveys the availability and/or willingness of users of the network communication system to communicate with other users of the network communication system. Such presence information is advantageous to persons who are logged on to the network communications system with a networked device and provides such logged on users with an indication of the user's willingness to communicate over the communication network, e.g., via an instant messaging application. However, providing network presence information of a user to other users operating a device connected to the network does not address the problem of alerting persons in the vicinity of the headset user, such as someone wishing to speak to the headset user in-person, as to the headset user's availability or willingness to communicate, e.g. face-to-face.

Accordingly, the current disclosure provides an improved headset for computer telephony that provides a visual indication of the headset user's presence information or status, and which overcomes the above problems and others.

SUMMARY

In one aspect, a computer telephony headset for supporting communication of audio data over a network via a host device of the network is provided. The headset includes an earpiece operable to receive electronic audio signals and render the electronic audio signals audible to a user wearing the headset. A microphone is attached to the earpiece and is operable to convert sounds into transmitted electronic signals. A processor is configured to receive presence data from the host device, the presence data being representative of a presence status of the user. A visual indicator is operably connected to the processor for providing a visual indication of the presence status of the user based on the presence data.

In another aspect, a computer telephony system of a type that allows two-way audio communication over a network includes a computer processor based host device configured to generate presence data representative of a presence status of the user. A headset includes an earpiece operable to receive electronic audio signals and render the electronic audio signals audible to the first user; a microphone attached to the earpiece and operable to convert sounds into transmitted electronic signals; a processor configured to receive presence data from the host device; and a visual indicator operably connected to the processor for providing a visual indication of the presence status of the user based on the presence data.

In yet another aspect, a method for displaying a visually perceptible indication of a computer telephony user's availability and/or willingness to communicate includes providing a computer telephony headset for supporting communication of audio data over a network via a host device of the network. The headset comprises an earpiece operable to receive electronic audio signals and render the electronic audio signals audible to the user and a microphone attached to the earpiece and operable to convert sounds into transmitted electronic signals. The method further includes receiving presence data from the host device using a processor, the presence data representative of a presence status of the user. A visual indicator operably connected to the processor is activated to provide a visual indication of the presence status of the user based on the presence data.

BRIEF DESCRIPTION OF THE DRAWINGS

It is to be understood that both the illustrated embodiments and the description herein are exemplary and explanatory only and are not restrictive of the invention as claimed. The accompanying drawings, which are incorporated in and constitute a part of the specification, illustrate presently preferred embodiments of the invention and should not be limitative of the scope of the present invention.

DETAILED DESCRIPTION OF THE PREFERRED EMBODIMENTS

Figure 1:
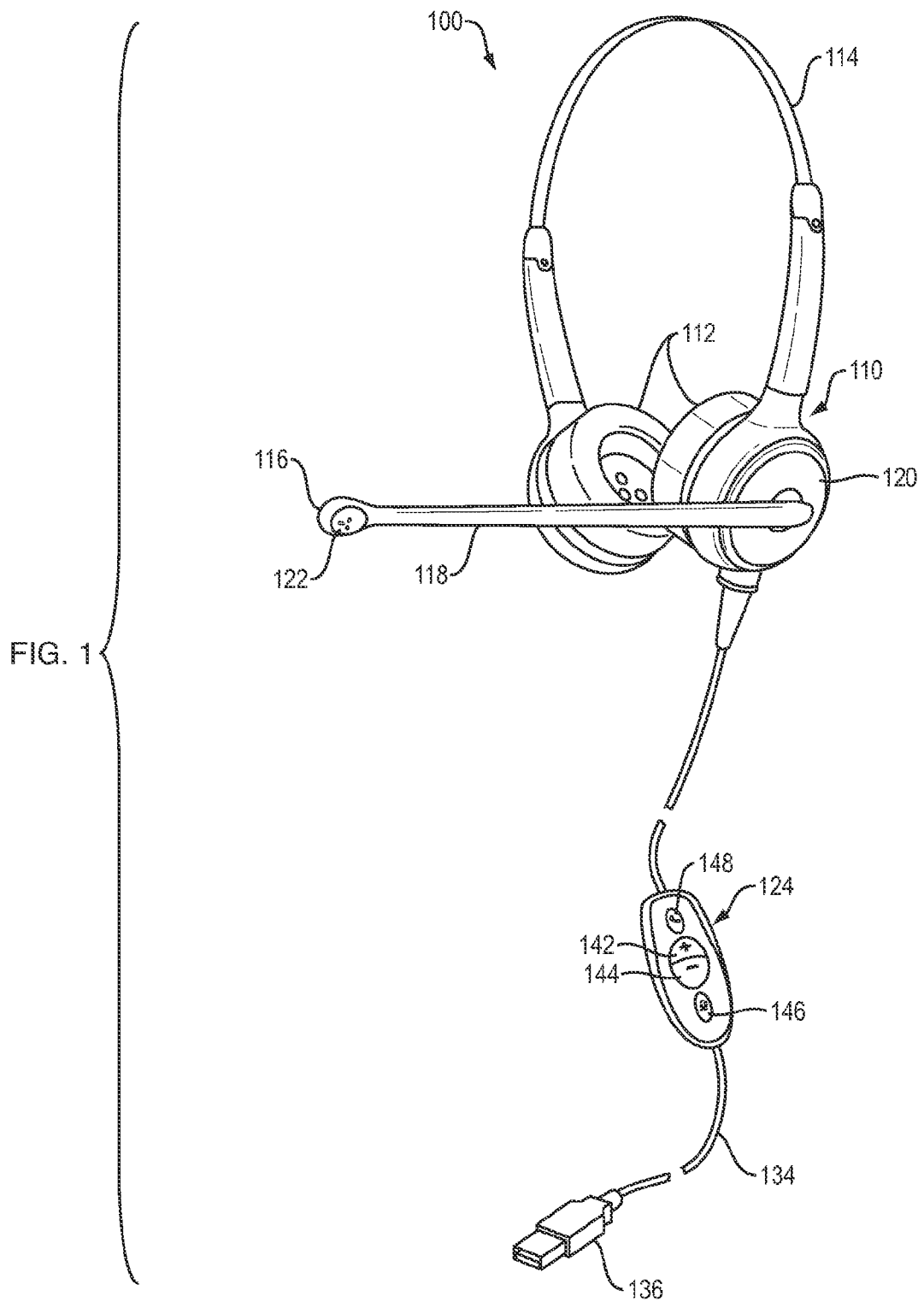
FIG. 1 is a pictorial image of a headset in accordance with an exemplary embodiment of the present invention.
Figure 2:
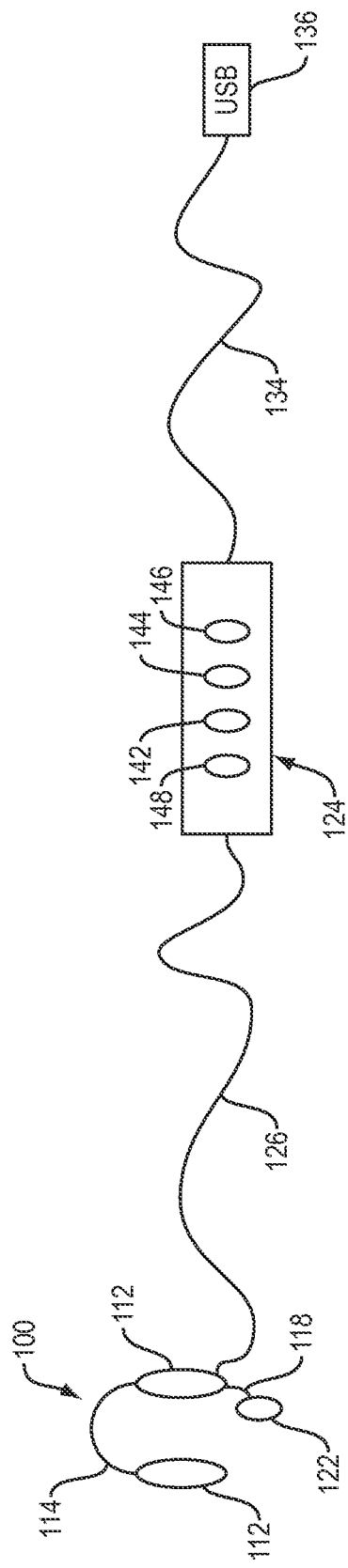
FIG. 2 is a somewhat schematic diagram of the headset appearing in FIG. 1.
Figure 3:
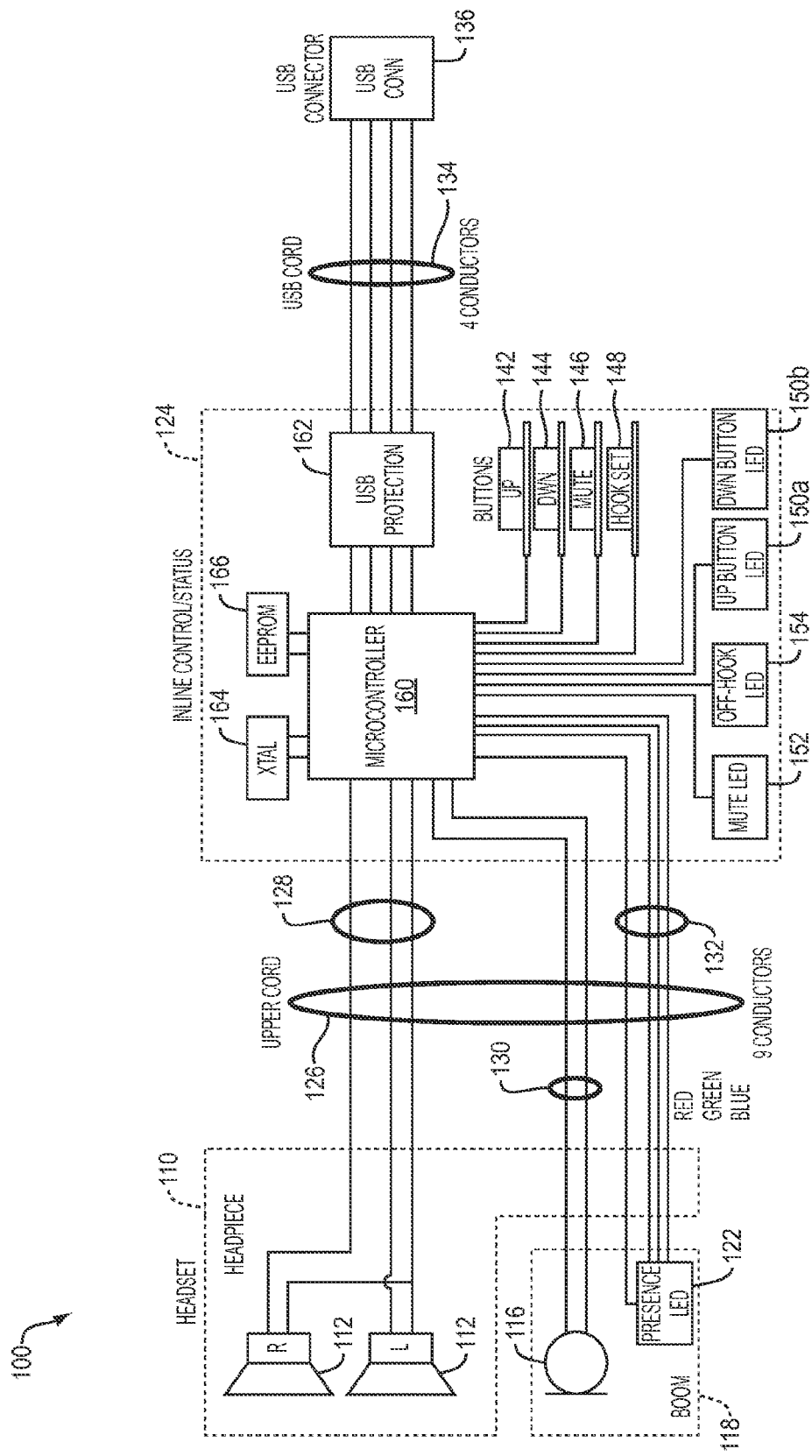
FIG. 3 is a block diagram the headset embodiment of FIG. 1.

With reference to FIGS. 1-3, a headset 100 in accordance with an exemplary embodiment includes an earpiece 110 comprising audio speakers 112 and a headband 114. The headband 114 may be size-adjustable as is generally known in the art. Although the illustrated headset 100 is shown with two audio speakers 112, it will be recognized that alternative embodiments could employ a single speaker. Likewise, the over-the-head headband 114 could be replaced with alternative fastener means for securing the headset in an operable position, such as ear hook for securing the headset to the user's ear.

A microphone 116 is disposed at the end of a microphone boom or arm 118 coupled to the earpiece 110. The arm 118 may be rotatably coupled, e.g., via a rotatable turret 120, to allow the user to pivot the arm 118 until the microphone is at a desired position in front of the mouth of the user. An LED indicator 122 is also positioned at the end of the microphone arm 118. In the illustrated preferred embodiment, the LED indicator 122 is provided on the outside of the arm 118 so as to be visible to a person facing a user wearing the headset. Although the indicator 122 is preferably an LED light source, it will be recognized that other types of light sources are also contemplated, including incandescent lamps and others.

It will be recognized that the LED indicator 122 could also be positioned at an alternative location on the headset, such as the speaker housing, headband, other positions along the boom, etc. Alternatively or additionally, the LED indicator could be on the inline control module 124 (discussed below). In still further embodiments, the LED indicator could be provided on a dedicated member, such as an extension member of the type described in U.S. Pat. No. 6,879,688.

In certain embodiments, the LED indicator 122 and/or the microphone 116 could be incorporated into the earpiece 110, such that the boom 118 could include a hollow channel forming an audio wave guide for transmitting sound waves from the distal end of the boom 118 to a microphone located at the proximal end of the boom. Likewise, LED's located at the proximal end of the boom 118 could transmit light to the distal end of the boom, e.g., to a diffuser located at the end of the boom, wherein the hollow channel interior surface is highly reflective.

An inline control module 124 is connected to the earpiece 110 via an upper cord or connecting line 126 including electrical conductors 128 for transmitting an audio signal to the speakers 112 from the control module; electrical conductors 130 for transmitting an audio signal from the microphone 116 to the control module; and electrical conductors 132 for driving the LED indicator 122, as will be described in greater detail below. A USB cord or cable 134 and USB connector 136 are provided for connecting the control module 124 to a host computer system 140 (see FIG. 4).

The control module 124 includes volume up and volume down buttons 142, 144, a mute button 146, and a hook set button 148. The volume buttons 142, 144 may be pressed to raise or lower, respectively, the volume of the audio signal output to the speakers 112. Button backlight LEDs 150a, 150b may be provided to illuminate the buttons 142 and 144. The LEDs 150a, 150b may be, for example, a white LED.

The mute button 146 may be pressed to selectively toggle the microphone 116 on and off. For example, the mute button 146 may be pressed during a phone call to allow the user to speak without being heard by the other person or persons on the phone call. Pressing the mute button again turns the microphone back on. A backlight LED 152 may be provided to illuminate the mute button 146. For example, the mute LED 152 may be turned off when the microphone 116 is operational and illuminated when the microphone 116 is muted. The mute LED 152 may be a red LED.

The hook button 148 may be used in conjunction with a software telephony (softphone) application on the host system 140 to take the softphone application off-hook (i.e., to place a call) or on-hook (i.e., to end a call). A backlight LED 154 may be provided for the button 148, for example to illuminate the button 148 when the softphone application is off hook or on a call. The hook set backlight LED 154 may be, for example, green.

As shown in FIG. 3, the inline control module includes a processor 160, such as a microprocessor, microcontroller, or the like, and receives data and power from the host system 140 via the cable 134. A USB protection circuit 162 may be provided between the USB connector 136 and the processor 160, for example, for protecting the processor 160 from overcurrent. A crystal oscillator clock 164 is provided to drive the various circuit components of the processor 160. Nonvolatile memory 166 is coupled to the processor 160 for storing computer readable instructions and data when power is removed from the headset 100. The non-volatile memory 166 may be, for example, Electrically Erasable Programmable Read-Only Memory (EEPROM), flash memory, or other suitable computer readable medium.

The processor 160 includes a USB audio codec for converting digital audio data from the host system 140 into an analog audio signal and sending the audio signal to the speakers 112 and for digitizing an analog audio signal from the microphone 116 and sending a digital representation of the audio signal from the microphone to the host system 140. The processor 160 may include additional digital signal processing features, including equalization, noise reduction, acoustic echo cancellation, automatic gain control, compression, audio effects such as 3-D sound, and so forth.

Figure 4:
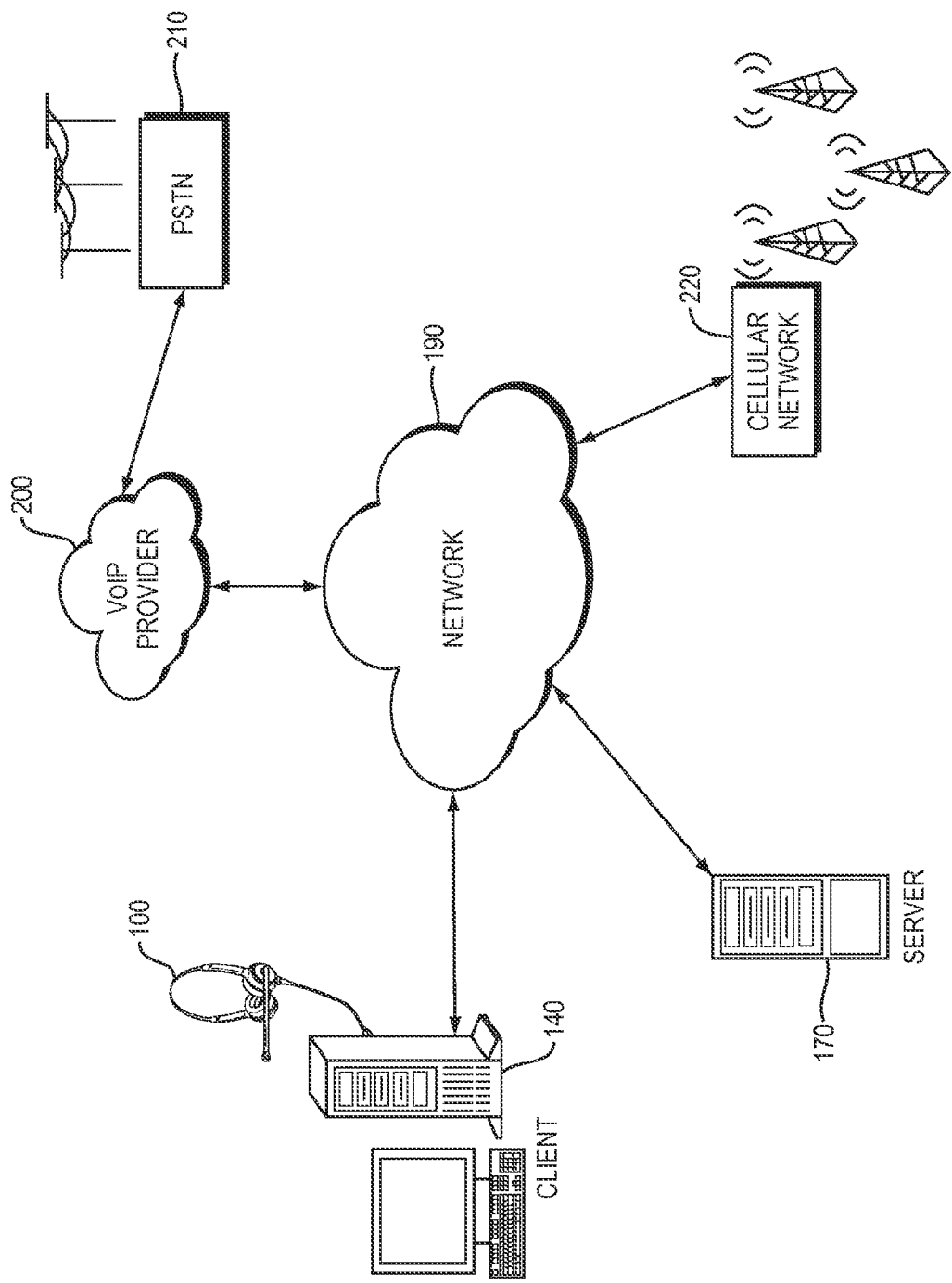
FIG. 4 illustrates an exemplary network communication system in which the headset in accordance with this disclosure may be employed.

Referring now to FIG. 4, an exemplary networked information handling system is illustrated. The networked system includes one or more network servers 170 interconnected with one or more remotely located client computer systems, such as the host system 140, via a network designated generally as 190, which may include one or more local area networks, wide area networks (WAN), personal area networks (PAN), intranets, the Internet, and others, as well as interconnections thereof. For example, the client system 140 and server system 170 may be configured to access the Internet via a local area network.

A Voice over Internet Protocol (VoIP) provider 200 allows the user of the headset 100 running a computer telephony or softphone application on the host system 140 to communicate with other users on the network 190, as well as telephone users on the Public Switched Telephone Network (PSTN) 210 and cellular mobile telephone networks 220.

The server computer system 170 may include server messaging software or like communication software of the type that stores and transmits presence information of users on the network. The presence information is representative of the user's network presence status, which may be predetermined, e.g., based on a state or condition of the user's host computer system 140 and/or selectable by the user. In this manner, the published network presence status may be representative of the user's availability and/or the user's willingness to communicate. Examples of such server software include Microsoft Lync Server, Avaya One-X server, Cisco Unified Communications Manager, and the like. The host computer system 140 and other client systems on the network 190 likewise run the corresponding messaging client software, such as Microsoft Lync, Avaya One-X client, Cisco IP Communicator, or the like.

The host computer system 140 and the server computer system 170 may be, for example, a computer-based information handling system as generally described below by way of reference to FIG. 5. A block diagram illustrating the connection between the host system 140 and the headset 100 appears in FIG. 6.

Figure 5:
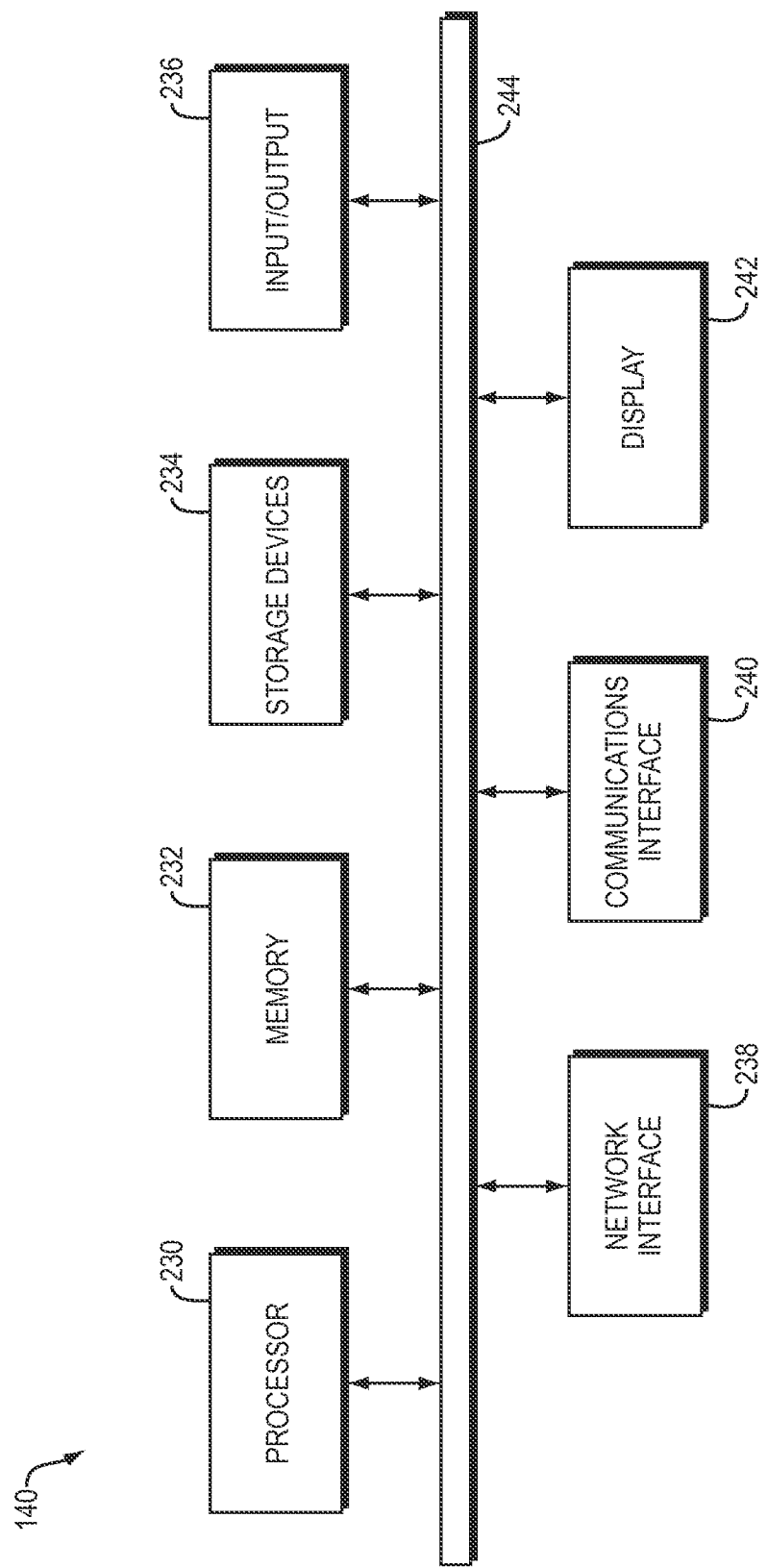
FIG. 5 is a functional block diagram of an exemplary computer system herein.
Figure 6:
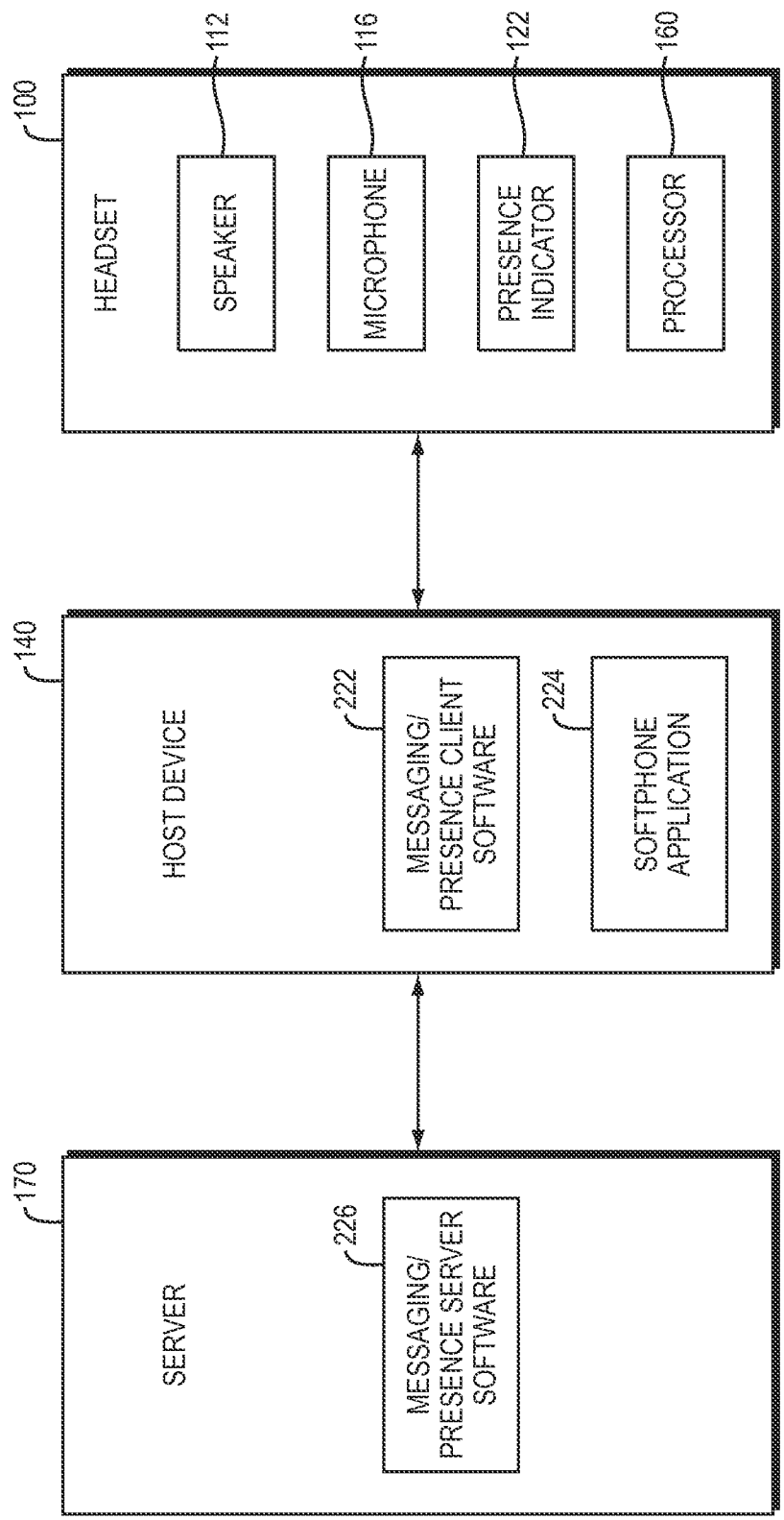
FIG. 6 is a block diagram of an exemplary host system with headset in accordance with this disclosure.

Referring now to FIG. 5, there appears an exemplary information handling system 140 representative of the host system hardware for running the softphone application 222 (see FIG. 6) and the messaging/presence software application 224 (see FIG. 6) and configured to operate in the network 190. It will be recognized that the softphone application could be a module or function within the messaging/presence software application. It will also be recognized that the hardware configuration shown in FIG. 2 is likewise representative of a hardware configuration of the server computer system 170 for running the messaging/presence server software. The hardware system 140 appearing in FIG. 5 is generally representative of a computer-based information handling system, such as a PC, workstation, a mini-computer, mainframe computer, or the like.

The hardware system 140 includes a central processing system 230, a memory 232, one or more storage devices 234, including main and auxiliary memory, an input/output (I/O) system 236, a network interface 238, a communications interface 240, and a display system 242 operably connected by a bus 244.

The hardware system 140 is controlled by the central processing system 230, which may include a central processing unit such as a microprocessor or microcontroller for executing programs, performing data manipulations and controlling the tasks of the hardware system. The processor 230 can be any suitable Intel, AMD, Motorola, Texas Instruments, or Sun processor, or the like. Communication with the central processor 230 is implemented through the system bus 244 for transferring information among the components of the hardware system.

The memory 232 provides storage of instructions and data for programs executing on the central processing system 230. The memory 232 is typically semiconductor-based memory as would be generally understood by persons skilled in the art. The storage devices 234 may include semiconductor-based memory such as read-only memory (ROM), programmable read-only memory (PROM), erasable programmable read-only memory (EPROM), electrically erasable programmable read-only memory (EEPROM), flash memory, and so forth. The storage devices 234 may also include a variety of non-semiconductor-based memories, including but not limited to hard disk, floppy disc, compact disc read-only memory (CD-ROM), digital versatile disc read-only memory (DVD-ROM), and so forth.

The display system 242 may comprise a display device and a video display adapter having the components for driving a display device, including video memory, buffer, and graphics engine as desired. The display device may comprise a video monitor such as a cathode ray-tube (CRT) display, liquid-crystal display (LCD), light-emitting diode (LED) display, gas or plasma display, and so forth.

The input/output (I/O) system 236 may comprise one or more controllers or adapters for providing interface functions between one or more I/O devices. The input/output system 236 may comprise one or more serial ports, parallel ports, universal serial bus (USB) ports, IEEE 1394 ports, infrared ports, etc., for interfacing with corresponding I/O devices, including the headset 100 disclosed herein, and any number of other I/O devices such as a keyboard, mouse/pointing device, printer, modem, microphone, speaker, and so forth.

The network interface 238 may be connected to a network, such as the network 190, to communicate to other computers, external devices, networks, or information sources on the network 190. The network interface 238 may be a network adapter implementing, for example, IEEE 802 network standards (e.g., IEEE 802.3 for Ethernet networks, IEEE 802.11 for wireless networks, IEEE 802.15 for personal area networks, IEEE 802.16 for broadband wireless metropolitan networks, and so on.).

The communications interface 240 may be connected to a network, such as the Internet for communication with other computers or devices using an ISP and/or a dial up phone system to connect to the network. The communications interface 240 can be a modem, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that the hardware system 140 of FIG. 5 is illustrative and exemplary only.

Figure 7:
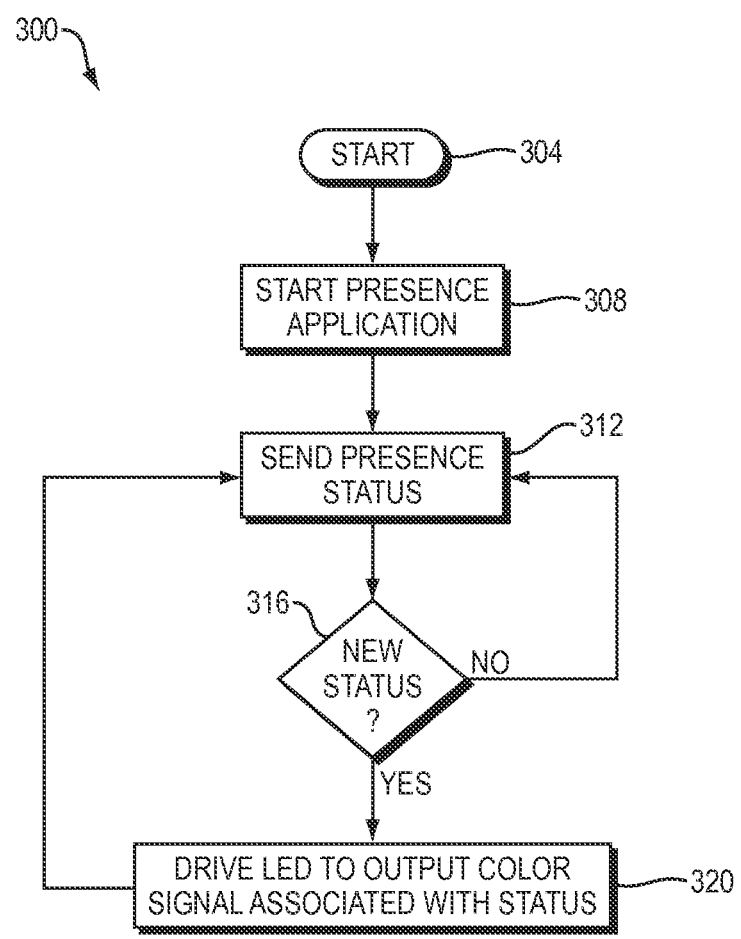
FIG. 7 is a flow chart illustrating an exemplary method for receiving and displaying presence information.

Referring now to FIG. 7, there appears a flow chart outlining an exemplary method 300 in accordance with the present invention. The process 300 starts at step 304 and at step 308, the user runs the client messaging/presence software application and a presence state is selected from among a plurality of preset of predefined or predetermined network presence status levels or states. It will be recognized that the predefined or predetermined status levels may include default presence status levels in the messaging software 222, as well as custom or user-defined presence status levels. It will also be recognized that in preferred embodiments, the presence status to be published over the network 190 will include status levels that are selectable by the user via the presence/messaging software 222 as well as status levels that are published automatically by the software 222.

The presence status information is sent to the server 170 and may be viewed on other networked devices on or accessing the network 190. For example, the server software 226 on the server 170 may store the user's presence status information. Other networked users connected to the server 170 may then view on-screen indicia of the user's status, which includes an on-screen graphic displayed in connection with information about the user, wherein the color of the on-screen graphic is correlated to a given status or availability level. By way of example only, the correlation between presence status level and color could be as shown in Table 1:

TABLE 1

| Color | Presence Status |
|---|---|
| Off | Offline |
| Green | Available |
| Orange Red | Busy |

TABLE 1-continued

| Color | Presence Status |
| --- | --- |
| Red | Do not disturb |
| Orange | Urgent interruptions only |
| Yellow | Away/Out of office |

In an alternative embodiment, again given by way of example only, the presence status levels and corresponding colors may be as shown in Table 2:

TABLE 2

| Color | Presence Status |
| --- | --- |
| Off | None |
| Lime | Online/available |
| Green Yellow | Idle |
| Orange Red | Busy |
| Orange | Busy/Idle |
| Yellow | Away |
| Red | Do not disturb |
| Light Salmon | Offline |
| Light Green | Online/Idle |
| Blue | Ring |

At step 312, the user's published presence status information is sent to the headset 100 from the application software. For example, in certain embodiments, the presence data from the software 222 is sent to the processor 160 of the headset 100 as a part of the USB Human Interface Device (HID) output report. This presence status is used to determine which color (if any) is displayed on the indicator. At step 316, the headset processor 160 receives the user's published presence information and it is determined whether the user has a new or updated presence status or state. The new or updated status may be, for example, a presence state selected by the user via the presence software 222, or a presence state selected by the presence software under programmed control, for example, as a result of the user placing or receiving a call, the user logging off the network 190, the user's computer system remaining inactive or idle for some predetermined period of time, and so forth.

In the event the user has a new or updated presence status at step 316, the process continues to step 320 and the processor 160 drives the LED indicator 122 to achieve the color that corresponds to the received status level and returns to step 312.

The LED 122 is preferably a tri-color LED comprising red, green, and blue (RGB) elements in which the intensity of each element can be independently controlled to allow the colors to be mixed to produce virtually any color. The microphone boom 118 may include reflectors and/or diffusers to facilitate the mixing of the red, blue, and green components. Alternatively, the LED element 124 may be a self-contained RGB LED with an integral diffused lens. Of course, in alternative embodiments, the RGB LED could be replaced with an array of dedicated single color LEDs or lamps.

If the presence status is unchanged at step 316, the process returns to step 312 to monitor for any changes in the user's published status and continues as described above.

The systems and methods disclosed herein can be implemented as sets of instructions resident in the main memory of one or more computer systems. Until required by the computer system, the set of instructions may be stored in another computer readable memory such as a hard disk drive or in a removable memory such as an optical disk for utilization in a DVD-ROM or CD-ROM drive, a magnetic media for utilization in a magnetic media drive, a magneto-optical disk for utilization in a magneto-optical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored, e.g., electrically, magnetically, chemically, physically, or optically, so that the medium carries computer readable information.

All references cited above are incorporated herein by reference in their entireties.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A computer telephony headset for supporting communication of audio data over a network via a host device of the network, the headset comprising:
   an earpiece operable to receive electronic audio signals and render the electronic audio signals audible to a user wearing the headset;
   a microphone attached to the earpiece and operable to convert sounds into transmitted electronic signals;
   a processor configured to receive presence data generated by the host device for sending to a server on the network and accessible by one or more other devices on the network, the presence data representative of a network presence status of the user; and
   a visual indicator operably connected to the processor for providing a visual indication of the network presence status of the user based on the presence data.

2. The computer telephony headset of claim 1, wherein the network presence status is representative of one or both of the user's availability and the user's willingness to communicate.

3. The computer telephony headset of claim 1, wherein said earpiece includes a fastener selected from a headband and an ear hook.

4. The computer telephony headset of claim 1, wherein the visual indicator is disposed on the headset.

5. The computer telephony headset of claim 1, further comprising a boom attached to the earpiece, the boom receiving the microphone at a distal end of the boom, wherein the visual indicator is positioned at the distal end of the boom.

6. The computer telephony headset of claim 1, further comprising:
   a Universal Serial Bus (USB) connector for connecting the headset to the host device.

7. The computer telephony headset of claim 1, further comprising a control module electrically coupled to the headset, said control module including one or more of:
   a volume control configured to selectively increasing or decreasing a volume of the electronic audio signals;
   a mute button configured to selectively turn the microphone on and off; and
   a hook button configured to selectively take an associated softphone application on the host device on-hook and off-hook.

8. The computer telephony headset of claim 1, wherein the processor is configured to receive the presence data from the host device as report data in a Human Interface Device (HID) output report.

9. The computer telephony headset of claim 1, further comprising:
an oscillator operably connected to said processor, said oscillator for synchronizing receiving, processing, and outputting operations of said processor.

10. The computer telephony headset of claim 1, wherein said visual indicator includes a light-emitting diode (LED) light source.

11. The computer telephony headset of claim 10, wherein said LED light source is a color mixing LED including a plurality of LED elements, wherein at least two of the plurality of LED elements emit light at different wavelengths.

12. The computer telephony headset of claim 10, wherein the color mixing LED includes three LED elements, wherein the three LED elements are configured to emit, respectively, red light, green light, and blue light.

13. The computer telephony headset of claim 1, wherein the presence data is representative of a network presence status selected from: "offline," "available," "busy," and "away".

14. The computer telephony headset of claim 1, wherein the presence data is representative of a network presence status selected from: "available," "busy," "do not disturb," "urgent interruptions only," and "away".

15. The computer telephony headset of claim 1, wherein the presence data is representative of a network presence status selected from: "online/available," "idle," "busy," "busy/idle," "away," "do not disturb," "offline," "online/idle," and "ring".

16. A computer telephony system of a type that allows two-way audio communication over a network, the system comprising:
a computer processor based host device in communication with a server, the host device configured to generate presence data representative of a network presence status of the user, said presence data for sending to the server over the network and accessible by one or more other devices on the network; and
a headset including: (i) an earpiece operable to receive electronic audio signals and render the electronic audio signals audible to the user; (ii) a microphone attached to the earpiece and operable to convert sounds into transmitted electronic signals; (iii) a processor configured to receive the presence data from the host device; and (iv) a visual indicator operably connected to the processor for providing a visual indication of the network presence status of the user based on the presence data.

17. The computer telephony system of claim 16, wherein said server includes presence software selected from messaging software, Microsoft Lync, Avaya One-X, and Cisco Unified Communications Manager.

18. The computer telephony system of claim 16, wherein said visual indicator includes a multi-color light-emitting diode (LED) light source.

19. The computer telephony system of claim 18, wherein the visual indication is color coded, and further wherein the processor is configured to cause the visual indicator to display a color which is the same as a network presence status indication color published to said one or more other devices over the network.

20. A method for displaying a visually perceptible indication of a computer telephony user's availability and/or willingness to communicate, the method comprising:
providing a computer telephony headset for supporting communication of audio data over a network via a host device of the network, the headset comprising: (i) an earpiece operable to receive electronic audio signals and render the electronic audio signals audible to the user; (ii) a microphone attached to the earpiece and operable to convert sounds into transmitted electronic signals; (iii) a processor configured to receive presence data generated by the host device for sending to a server over the network, the presence data representative of a network presence status of the user; and (iv) a visual indicator operably connected to the processor for providing a visual indication of the network presence status of the user based on the presence data;
receiving the presence data from the host device using the processor; and
activating the visual indicator to provide a visual indication of the network presence status of the user based on the presence data.

* * * * *